(12) United States Patent
Eisner et al.

(10) Patent No.: US 8,401,929 B2
(45) Date of Patent: *Mar. 19, 2013

(54) METHOD, SYSTEM AND APPARATUS FOR E-MAIL REQUISITIONING

(75) Inventors: Noah Eisner, Menlo Park, CA (US); Dave Stephens, Half Moon Bay, CA (US); David Williams, Oakland, CA (US); Seggy Umboh, Oakland, CA (US)

(73) Assignee: Coupa Incorporated, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/439,526

(22) Filed: Apr. 4, 2012

(65) Prior Publication Data

US 2012/0209746 A1 Aug. 16, 2012

Related U.S. Application Data

(63) Continuation of application No. 12/079,819, filed on Mar. 28, 2008, now Pat. No. 8,156,012.

(60) Provisional application No. 60/920,889, filed on Mar. 30, 2007, provisional application No. 60/921,152, filed on Mar. 30, 2007, provisional application No. 60/921,116, filed on Mar. 30, 2007, provisional application No. 60/920,976, filed on Mar. 30, 2007, provisional application No. 60/921,218, filed on Mar. 30, 2007, provisional application No. 60/920,888, filed on Mar. 30, 2007, provisional application No. 60/921,055, filed on Mar. 30, 2007, provisional application No. 60/821,104, filed on Mar. 30, 2007.

(51) Int. Cl.
    *G06Q 30/00* (2012.01)
(52) U.S. Cl. .................................................. 705/26.81

(58) Field of Classification Search .................. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| 5,315,504 | A |   | 5/1994  | Lemble |
| 5,319,542 | A |   | 6/1994  | King, Jr. et al. |
| 5,758,327 | A |   | 5/1998  | Gardner et al. |
| 5,970,475 | A | * | 10/1999 | Barnes et al. ............... 705/26.35 |
| 7,219,130 | B2 | * | 5/2007  | Kumar et al. ................. 709/206 |
| 8,032,597 | B2 | * | 10/2011 | Khoo ............................ 709/206 |

OTHER PUBLICATIONS

Philip McCrea "Trends in Electronic Procurement", Office of Information Technology NSW Government, Dec. 1997.*
No Author, "Requisition Approval", University of Maine System, Jul. 6, 2005.*
United States General Accounting Office, "Report to Congressional Committees, Acquisition Reform, Purchase Card Use Cuts Procurement Costs, Improves Efficiency", B-271689, Dated Aug. 6, 1996, 22 pages.

* cited by examiner

*Primary Examiner* — Naeem Haq
(74) *Attorney, Agent, or Firm* — Hickman Palermo Truong Becker Bingham Wong LLP

(57) ABSTRACT

A method of and device for enabling the requisitioning of items over a network. The network is coupled to a server, thereby allowing communication between the server and a generating-user, a requisitioning-user and an initiating-user. The server generates a requisition template in response to input received from the generating-user. The server sends an initial e-mail message to the requisitioning-user's e-mail address in response to direction received from the initiating-user. The initial e-mail message includes the requisition template. The initial e-mail message is configured to result in the creation of a reply e-mail message in response to the requisitioning-user selecting to reply to the initial e-mail message from the e-mail application that is accessing the initial e-mail message, the reply e-mail message including the requisition template.

24 Claims, 7 Drawing Sheets

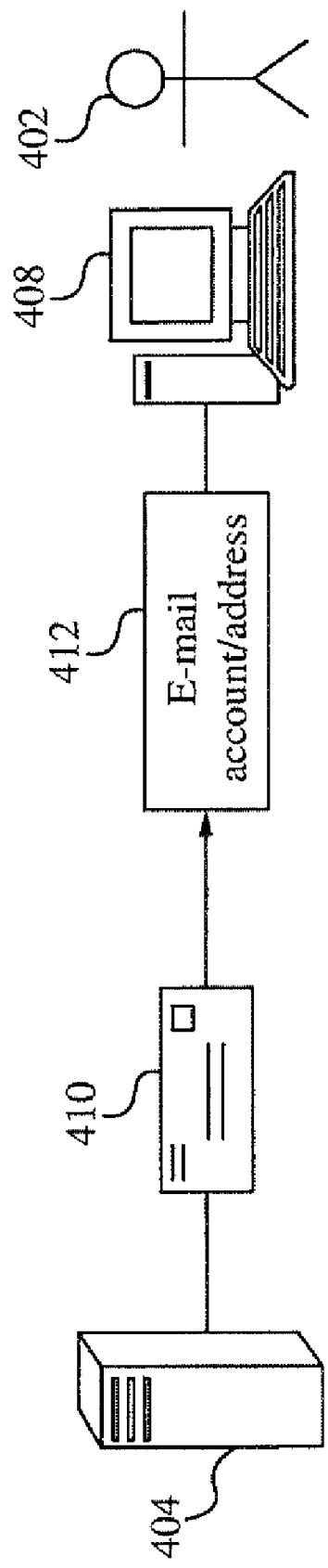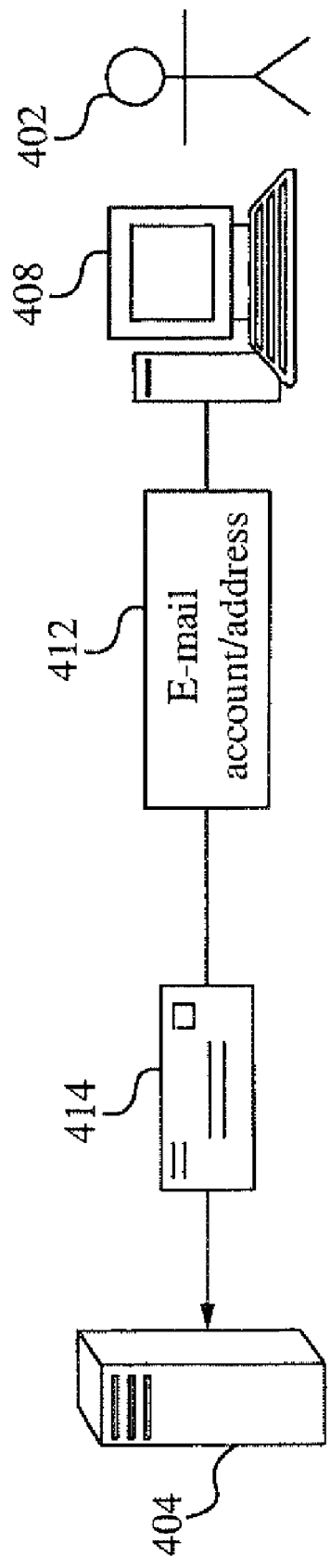
Fig. 4A
Fig. 4B

| | Item | Price | Quantity |
|---|---|---|---|
| 502-1 | Mouse Pad<br>8" x 8", blue | $4.19 | 0 |
| 502-2 | Ink Cartridge<br>large, black | $33.99 | 0 |
| 502-3 | USB Device Cable<br>6 feet long | $19.99 | 0 |
| 502-4 | Self-Stick Notes<br>3" x 3"<br>90 sheets per pad, pack of 12 pads | $14.99 | 0 |

Fig. 5A

| | Item | Price | Quantity |
|---|---|---|---|
| 502-1 | Mouse Pad<br>8" x 8", blue | $4.19 | 1 |
| 502-2 | Ink Cartridge<br>large, black | $33.99 | 4 |
| 502-3 | USB Device Cable<br>6 feet long | $19.99 | 0 |
| 502-4 | Self-Stick Notes<br>3" x 3"<br>90 sheets per pad, pack of 12 pads | $14.99 | 2 |

Fig. 5B

METHOD, SYSTEM AND APPARATUS FOR E-MAIL REQUISITIONING

This application claims the benefit under 35 U.S.C. §120 as a Continuation of application Ser. No. 12/079,819, filed Mar. 28, 2008, the entire contents of which are hereby incorporated by reference as if fully set forth herein. The applicant hereby rescinds any disclaimer of claim scope in the parent application or in the prosecution history thereof and advises the USPTO that the claims in this application may be broader than any claim in the parent application.

CROSS-REFERENCE TO RELATED APPLICATIONS

This application claims priority to co-pending U.S. Provisional Application Ser. Nos. 60/920,889, 60/821,104, 60/921,152, 60/921,116, 60/920,976, 60/921,218, 60/920,888, and 60/921,055, all of which were filed on Mar. 30, 2007, and all of which are hereby incorporated by reference as if set forth herein.

FIELD OF THE INVENTION

The present invention relates generally to the field of online ordering of goods and services, such as electronic procurement or any e-mail based ordering system. More specifically, the present invention relates to a system for and method of enabling the requisitioning of goods and services directly through an e-mail system.

BACKGROUND OF THE INVENTION

For the purposes of this disclosure, the term "item" should be interpreted to refer to a good or a service. E-procurement web sites allow qualified and registered users to look for buyers or sellers of desired goods and services. However, such web sites inconveniently require a user to log in and select these items each time the user wants to make an item requisition. What is needed in the art is a method of and system for providing convenient and reliable item requisitioning.

SUMMARY OF THE INVENTION

Unlike the prior art, the present invention does not require a user to log onto a web site every time he or she wants to requisition an item. Instead, requisition templates can be created by a user (generating-user) and maintained future use. The templates can be maintained in a variety of different locations, including, but not limited to, the user's local client machine (e.g., user's personal computer), the user's e-mail account (e.g., memory on the server of the user's interne service provider allocated to the user), and an external server accessible to multiple users (e.g., server of the company providing the template creation program). These requisition templates include a listing of selected items that a user (e.g., a company employee) can order, along with the capability to have the quantity of each item adjusted to reflect the desired amount. At an appropriate time, such as when a user with sufficient authority wants to initiate the requisitioning process, this user (initiating-user) prompts the server to send an e-mail containing the requisition template to selected users (requisitioning-users). After receiving this initial e-mail, each requisitioning-user can simply open it and select the reply option in his or her e-mail program, thereby creating a reply e-mail that contains the requisition template in the body of the message. The requisitioning-user can then adjust the quantity of each listed item to reflect the then currently desired amount of each good or service. Once the quantity levels are set, the requisitioning-user sends the reply e-mail to the server for processing. In this respect, the present invention enables the requisitioning-user to requisition items without logging into the server.

Upon receiving and reading the reply e-mail, the server can send a confirmation e-mail to the requisitioning-user to inform him or her that the request has been successfully received and/or processed. Additionally, the server can send an error notification e-mail if the server was unsuccessful in processing the reply e-mail. The server can also determine whether or not approval is necessary for the item request. This determination can be based on a single factor or a combination of factors, including, but not limited to, the authority level of the requisitioning-user, the type of item, an individual item price, an individual item quantity, the total price of items, and the total quantity of items. If approval is not necessary, then the server can send a purchase order to the supplier. However, if approval is necessary, the server initiates an approval process, sending an e-mail to the appropriate users (approving-users), such as a department manager, requesting approval of the requisition. Once each of these approving-users approves the item request, the order can go to the supplier. However, if one of these approving-users denies the item request, the server prevents the order from going through and preferably informs the requesting user of the requisition rejection.

When processing the reply e-mail, the system can apply a set of intelligent defaults based on its identification of the requisitioning-user and the requested items in the template. Such defaults can include, but are not limited to, commodity information of the items, suppliers of the items, shipping address of the user, and the billing account information of the user. These defaults can be used in any of the system operations discussed in this disclosure, such as the determination and execution of approval processes and the generation of purchase orders.

In processing the reply e-mail, the server can also provide a failure notice to the requesting-user if the system determines that any of the requested items are not available for purchase. It is contemplated that the system can consider a variety of factors in determining the availability of a requested item.

A single user is not necessarily limited to one role. Rather, he or she can be recognized by the server to perform the functions of several roles. For example, the same user can be a generating-user that creates a template, an initiating-user that directs the server to send an initial e-mail with a template, a requisitioning-user that receives and replies to an initial e-mail, and an approving-user that approves or rejects another requisitioning-user's requisition. Therefore, the claims of the present invention should be interpreted to include the possibility of a single user performing any combination of these roles, unless claimed otherwise.

It is contemplated that the present invention can be implemented in a variety of ways and that certain steps detailed in this disclosure can be omitted or repeated based on the particulars of a given application.

In one embodiment of the present invention, a method of enabling the requisitioning of items over a network is disclosed. The network is coupled to a server, thereby allowing communication between the server and a generating-user, a requisitioning-user and an initiating-user. The method comprises the steps of: the server generating a requisition template in response to input received from the generating-user, and the server sending an initial e-mail message to the requisitioning-user's e-mail address in response to direction received from the initiating-user. The initial e-mail message includes the requisition template and is configured to result in the creation of a reply e-mail message in response to the requisitioning-user selecting to reply to the initial e-mail message from the e-mail application that is accessing the initial e-mail message. The reply e-mail message includes the requisition template.

In another embodiment of the present invention, a method of enabling the requisitioning of items over a network is disclosed. The network is coupled to a server, thereby allowing communication between the server and a generating-user, a requisitioning-user and an initiating-user. The method comprises the steps of: the server generating a requisition template in response to input received from the generating-user, and the server sending an initial e-mail message to the requisitioning-user's e-mail address in response to direction received from the initiating-user. The initial e-mail message includes the requisition template. The requisitioning-user receives the initial e-mail message at the requisitioning-user's e-mail address, and then accesses the initial e-mail message using an e-mail application. The requisitioning-user selects to reply to the initial e-mail message from the e-mail application, and the e-mail application creates a reply e-mail message in response to the requisitioning-users selection to reply. The reply e-mail message includes the requisition template.

In yet another embodiment of the present invention, a program storage device readable by a machine, tangibly embodies a program of instructions executable by the machine to perform a method for enabling the requisitioning of items over a network. The network is coupled to the machine, thereby allowing communication between the machine and a generating-user, a requisitioning-user and an initiating-user. The method comprises: the machine generating a requisition template in response to input received from the generating-user, and the machine sending an initial e-mail message to the requisitioning-user's e-mail address in response to direction received from the initiating-user. The initial e-mail message includes the requisition template and is configured to result in the creation of a reply e-mail message in response to the requisitioning-user selecting to reply to the initial e-mail message from the e-mail application that is accessing the initial e-mail message. The reply e-mail message includes the requisition template.

For each of these embodiments, users can share requisition templates by sending them to one another. For example, after receiving the initial e-mail message that includes the requisition template, a user can send the template to another user via e-mail, such as by simply forwarding the initial e-mail message to the other user. This other user can then become a requisitioning-user simply by selecting to reply to the initial e-mail message using his or her e-mail application.

Additionally, for each of these embodiments, the requisition template preferably comprises one or more indicium. Each indicium is configured to represent an item that can be requisitioned by the requisitioning-user and has its own associated quantity field. The input received by the server from the generating-user to generate the requisition template is a selection of the one or more indicium to be included in the requisition template.

In a preferred embodiment, the quantity field represents the quantity of the associated item that is desired by the requisitioning-user. The quantity field is configured to be set to a desired value by the requisitioning-user. This desired value can be different from the original value of the quantity field at the time the initial e-mail message was received by the requesting-user. The requisition template in the reply e-mail message is configured to include the desired value in the quantity field. Preferably, the quantity field is configured to be set to a desired value by the requisitioning-user while the requisition template is in the body of the reply e-mail message.

The requisition template can include a code and item name for each item in order to ensure that the server can properly associate each requested item on the requisition template with the corresponding item stored on the system server.

In a preferred embodiment, the server receives the reply e-mail message from the requisitioning-user's e-mail address. The server then processes the reply e-mail message to determine the identity and the quantity of any items desired by the requisitioning-user based on a reading of the associated quantity fields in the requisition template of the reply e-mail message. The server determines the requisitioning-user's e-mail address from which the reply e-mail message was sent and associates the requisitioning-user's e-mail address with the identity and the quantity of any items desired by the requisitioning-user. As mentioned above, in processing the reply e-mail message, the system can apply a set of intelligent defaults based on its identification of the requisitioning-user and the requested items in the template. Such defaults can include, but are not limited to, commodity information of the items, suppliers of the items, shipping address of the user, and the billing account information of the user. These defaults can be used in any of the system operations discussed in this disclosure, such as the determination and execution of approval processes and the generation of purchase orders.

The server can send a confirmation e-mail message to the requisitioning-user's e-mail address in response to receiving the reply e-mail message from the requisitioning-user. The confirmation e-mail message contains information indicating the identity and the quantity of any items desired by the requisitioning-user based on the reading of the associated quantity fields in the requisition template of the reply e-mail message.

The server can also determine whether it is necessary to perform an approval process based on at least one of the group consisting of the requisitioning-user's e-mail address, the identity of any items desired by the requisitioning-user, the quantity of any items desired by the requisitioning-user, and any of the intelligent defaults that are automatically applied as discussed above. If the server determines that it is necessary, then the server performs the approval process. Preferably, the approval process comprises the server sending an approval-request e-mail message through the network to an approving-user's e-mail address. The approval-request e-mail message provides notification of the identity and the quantity of an item desired by the requisitioning-user and requests approval for the ordering of the quantity of the item. The server eventually receives an approval-decision from the approving-user(s). The approval process can further comprise the server sending a rejection notification message to the requisitioning-user's e-mail address if the approval-decision received from the approving-user is a rejection.

BRIEF DESCRIPTION OF THE DRAWINGS

FIG. 4A illustrates an exemplary embodiment of a server sending an initial e-mail containing a requisition template to a user in accordance with the principles of the present invention.

FIG. 4B illustrates an exemplary embodiment of the user sending a reply e-mail containing the requisition template to the server in accordance with the principles of the present invention.

FIG. 5A illustrates an exemplary embodiment of the requisition template included in the initial e-mail to the user in accordance with the principles of the present invention.

FIG. 5B illustrates an exemplary embodiment of the requisition template included in the reply e-mail to the server in accordance with the principles of the present invention.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

In a preferred embodiment, the steps of the present invention are embodied in machine-executable instructions. These instructions can be used to cause a general-purpose or special-purpose processor that is programmed with the instructions to perform the steps of the present invention. Alternatively, the steps of the present invention can be performed by specific hardware components that contain hardwired logic for performing the steps, or by any combination of programmed computer components and custom hardware components.

The present invention can be provided as a computer program product that can include a machine-readable medium having stored thereon instructions that may be used to program a computer (or other electronic devices) to perform a process according to the present invention. The machine-readable medium can include, but is not limited to, floppy diskettes, optical disks, CD-ROMs, ROMs, RAMs, magnet or optical cards, or other type of media/machine-readable medium suitable for storing electronic instructions.

Various aspects of the disclosure can be described through the use of flowcharts. Often, a single instance of an aspect of the present disclosure can be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Figure 1:
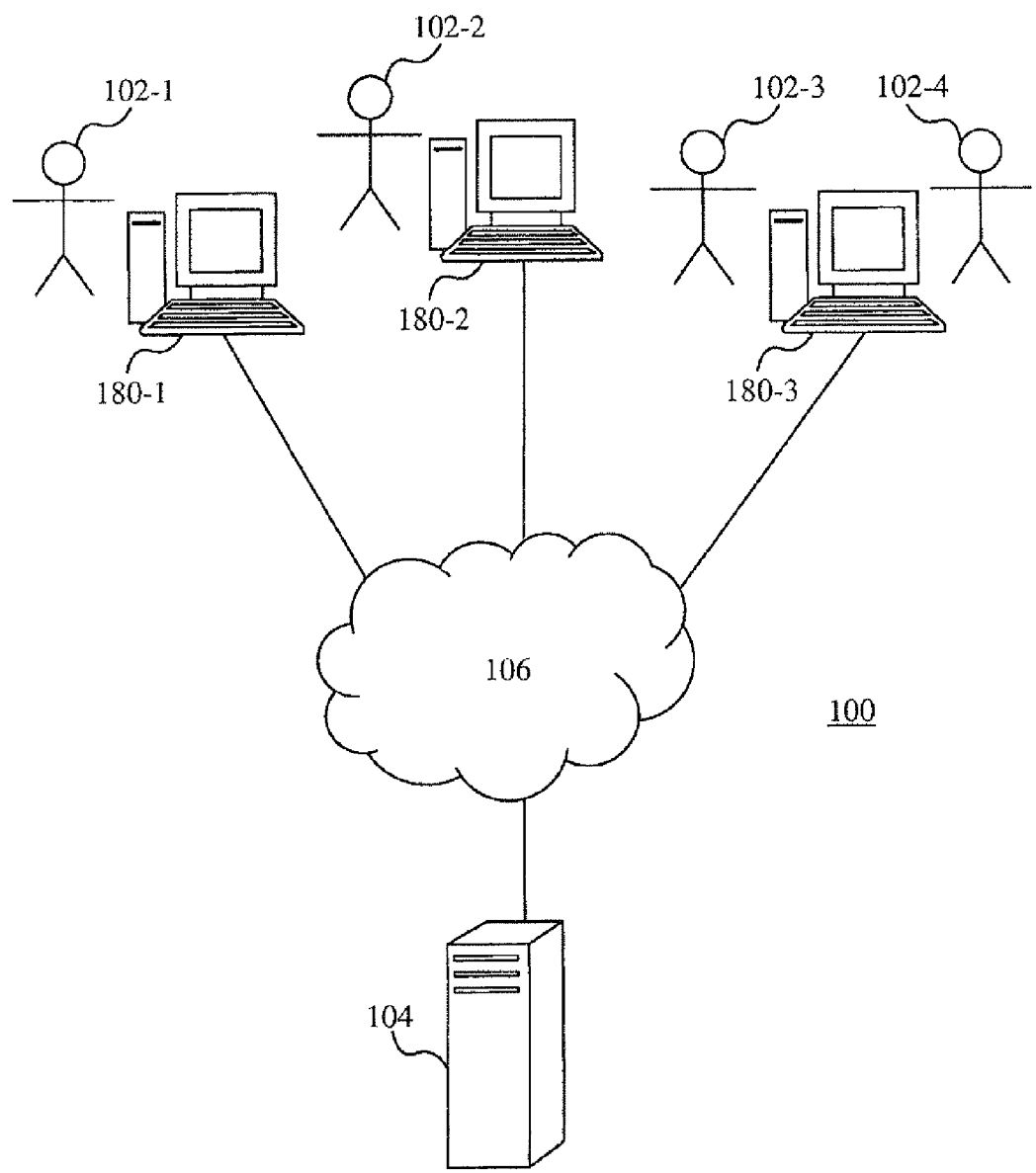
FIG. 1 illustrates an exemplary client-server environment in which the e-mail requisitioning system of the present invention operates.

FIG. 1 illustrates an exemplary client-server environment 100, such as the World Wide Web, in which the e-mail requisitioning system of the present invention operates. The architecture of this environment can follow a conventional client-server model. Users 102 use client machines 108 to communicate with a server 104 through a network 106, such as the Internet. The client-server model is typically used to communicate information between client machines 108 and the server 104. Client machines 108 can be any type of computer having e-mail capabilities, including, but not limited to, desktops, laptops, and hand-held computing devices. The server 104 can be any type of server configured to store and operate a web-based application. In a preferred embodiment, the e-mail requisition program of the present invention is a web-based application stored on the server 104. Users 102 can access the program through any client computer 108 that is coupled to the network 106. However, it is contemplated that the program can be stored, operated and accessed using a variety of other means as well.

Although the present invention can be applied to a variety of real world environments, it is ideally suited for organizations that want to facilitate the requisitioning of items by their members. For example, a company can use the present invention to enable certain employees to requisition items simply by using their e-mail program. In this scenario, these employees would be considered the users 102. Each of these users 102 is registered in the program on the server 104. Preferably, the server 104 stores information about the users 102. Such information can include, but is not limited to, the user's name (or some other form of identification, such as an ID number), the user's e-mail address, and information about the user's authority level (i.e., status information that can be used to determine under what situations a user will need approval for a requisition). As will be discussed in further detail below, the user's e-mail address is used by the server 104 to identify the user 102 to whom an e-mail is being sent or from whom an e-mail is being received. In this fashion, it is not required that each user 102 communicate with the server 104 using his or her own distinct computer 108. Instead, multiple users 102 can use the same computer 108 to communicate with the server 104, as the server 104 is configured to distinguish each user 102 based on his or her e-mail address rather than the computer's IP address. For example, in FIG. 1, the user 102-1 communicates with server 104 using computing machine 108-1 and the user 102-2 communicates with server 104 using computing machine 108-2. However, the user 102-3 and the user 102-4 both communicate with server 104 using the computing machine 108-3. Even though both of the users 102-3 and 102-4 use the same computing machine 108-3, their communications are directed through separate e-mail addresses so that the server 104 is able to distinguish between the two.

Setup and maintenance of the user database and other aspects of the server 104 can be restricted to one or more system administrators. In this case, the system administrator is responsible for adding an employee as a user to the server, removing a user, and modifying a user's profile (such as, changing the user's e-mail address or authority level). In a preferred embodiment, access to the server for performing such actions can be restricted to only a system administrator by requiring that the system administrator log onto the server using a confidential password. In some embodiments, a user can be granted limited access to perform certain creation or maintenance operations. For example, an ordinary user can use a password to log onto the server and change his or her own e-mail address. However, the ordinary user's access can be limited to performing only certain operations. Preferably, the ordinary user would not be able to change his or her own authority level or modify another user's profile.

Figure 2:
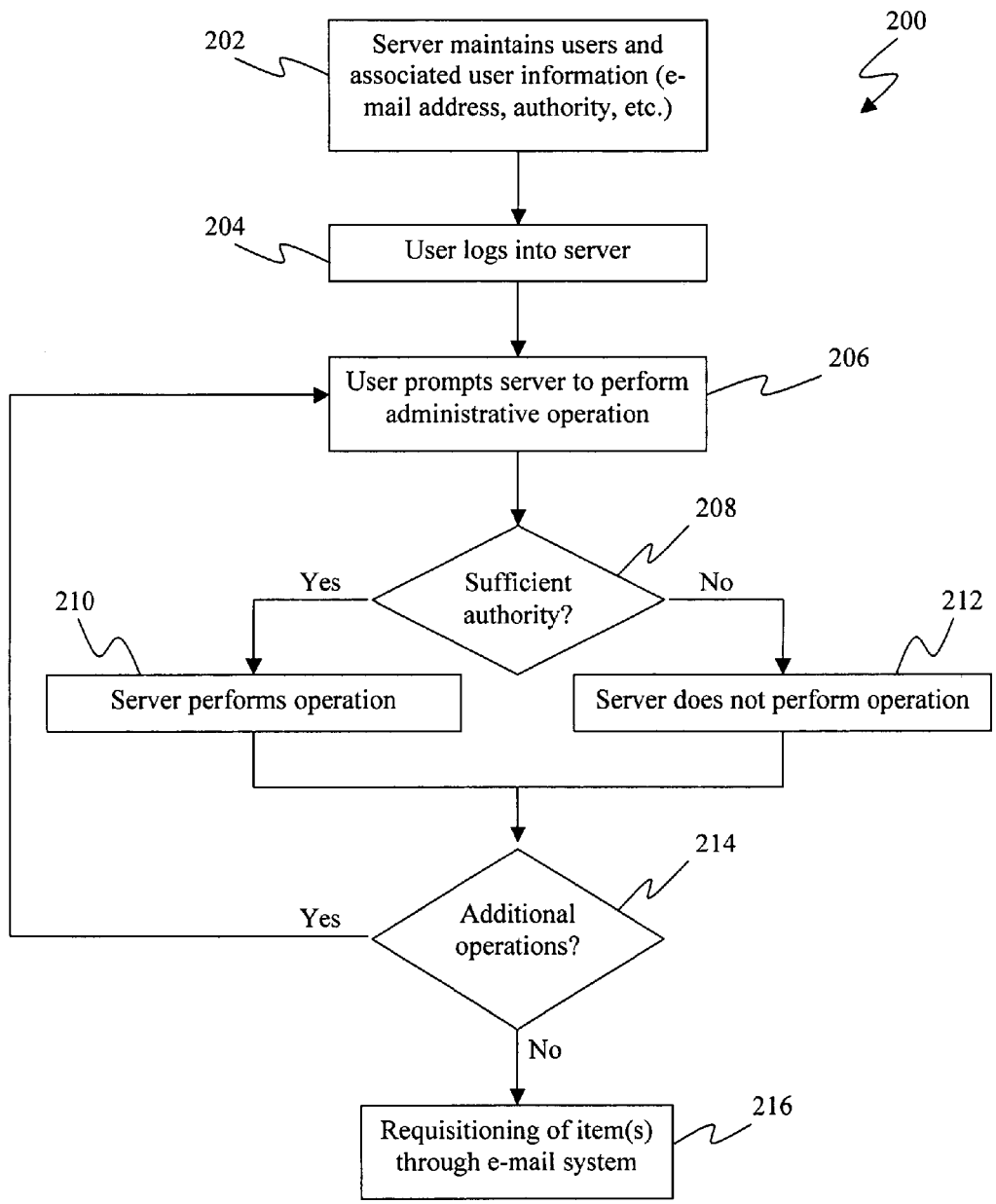
FIG. 2 is a flowchart illustrating an exemplary method for incorporating the performance of administrative operations into the system of the present invention.

FIG. 2 is a flowchart illustrating an exemplary method 200 of incorporating the performance of administrative operations into the requisitioning system of the present invention.

At a step 202, the server is storing records of the users and their associated user information (such as e-mail address and authority level). The accessibility of a user's record(s) can be restricted to those that have the required authority level. As mentioned above, one user preferably cannot access another user's records. Additionally, a user can be limited to accessing his or her record(s) for only certain purposes. For example, a user can be allowed to access his record to change his e-mail address, while at the same time being prevented from changing his own authority level.

At a step 204, a user logs into the system application on the server to perform one or more administrative operations. At a step 206, the user prompts the server to perform an administrative operation. Such prompting can include, but is not limited to, the user making certain selections in a web browser, or in some other way providing commands to the system application.

Preferably, prior to perform the administrative operation, the server verifies that the user has the requisite authority to perform the particular operation. As discussed above, certain operations can require a different level of authority than others. For example, removing a user from the server can require a higher authority level than a user simply changing his or her own e-mail address. However, the restrictions on performing certain operations can vary for each application of the present invention. At a step 208, the server determines whether or not the user has sufficient authority to perform the operation. This determination can be based on the user's profile and the requirements of the particular operation.

If the server determines that the user does have sufficient authority, then at a step 210 it proceeds with performing the operation. If the server determines that the user does not have sufficient authority, then at step 212 it does not perform the operation. Preferably, the server notifies the user that the operation can be performed A variety of administrative operations can be performed by an appropriate user. In a preferred embodiment, depending on the particular user, he or she can perform operations that affect user records on the server. It is contemplated that any single operation or combination of operations can be performed during the maintenance of the requisition system.

A user with appropriate authority can create a requisition template, which can be maintained in a storage location, such as the user's local client machine, the user's e-mail account, and an external server accessible to multiple users. Creating a template can involve the user browsing through a web site and selecting items to be placed in the template for potential requisitioning. Upon receiving this form, or some other form, of requisition creation input from the user, the server generates the requisition template and sends it to the appropriate user(s), as will be discussed below with respect to FIG. 3.

In an optional embodiment, the server can associate a template with a means for identification, such as a template name or ID, in order to facilitate the future identification and selection of the template. For example, a template created for the requisitioning of items for the sales department can be labeled "Sales." Such identification can be particularly useful in an embodiment where the template is stored on a server that allows multiple users to access to a database of templates on the server. Upon creation of the template, the server can also determine a minimum level of authority that is required for removing the template. Additionally or alternatively, the server may determine a particular user or subset of users that has the authority for removing the template. In such an embodiment, the user that creates the template will preferably have the requisite authority to perform such an operation.

A user with appropriate authority can also add a user to the server. The authority level and capabilities of this added user are preferably determined upon creation. Preferably, the server associates the added user with certain information that can be used to determine what operations he or she can perform (e.g., authority level) and how to perform them (e.g., e-mail address).

A user with appropriate authority can additionally remove a user from the server. The removed user no longer has the ability to perform any of the operations he or she was previously capable of performing.

A user with appropriate authority can also update a user's associated information. For example, if an employee in the sales department gets a new e-mail address, an administrative user can update this employees record on the server to reflect this change. Furthermore, an administrative user can wish to change the authority level of the employee, either giving that employee the ability to perform more or less system operations.

Once the operation is performed or denied, it is determined at a step 214 whether or not the user wants to perform any additional administrative operations. If the user does want to perform an additional operation, he or she once again makes the necessary prompting to the server back at a step 206. If the administrative user does not want to perform an additional operation, the system can proceed with the requisitioning of one or more items using an e-mail system at a step 216. It is contemplated that although FIG. 2 shows administrative operations being performed prior to the requisitioning of items, no administrative operation is required in order for the requisitioning to be performed, so long as the server is storing at least one user and the necessary user information.

Figure 3:
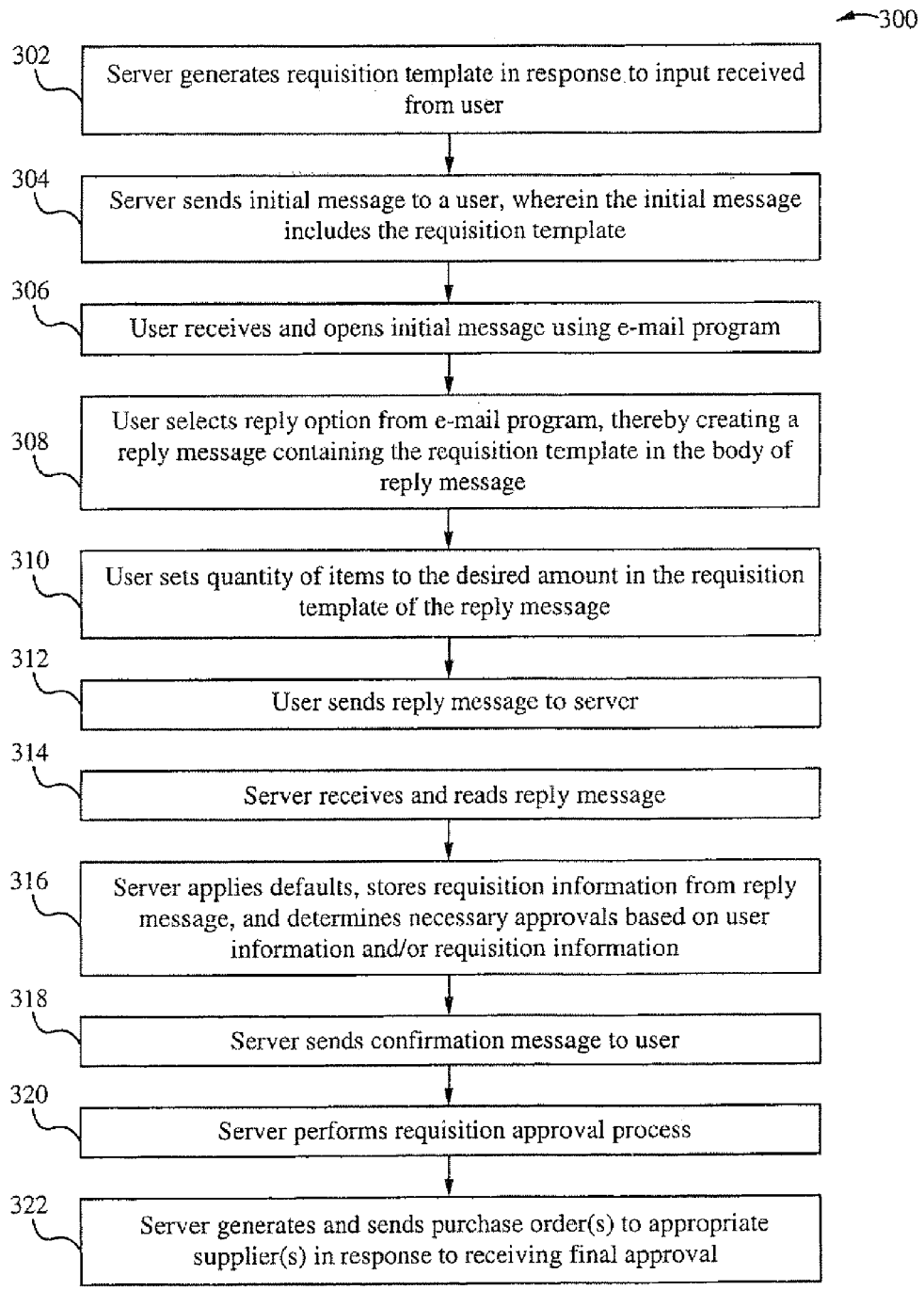
FIG. 3 is a flowchart illustrating an exemplary method for enabling the requisitioning of items directly through an e-mail system in accordance with the principles of the present invention.

FIG. 3 is a flowchart illustrating an exemplary method 300 of enabling the requisitioning of items directly through an e-mail system in accordance with the principles of the present invention.

At step 302, the server generates a requisition template in response to input received from a user. As discussed above, such input can include, but is not limited to, item selections made by the user while browsing through a web site.

At a step 304, the server sends an initial message to a requisitioning-user. In a preferred embodiment, the initial message includes a requisition template. This initial message is preferably prompted by an initiating-user. As discussed above, this initiating-user can be the same as the user that generated the requisition template and/or the requisitioning-user. For example, it is possible for the same user to create a template and prompt the server to send the initial message with the requisition template to himself or herself. The initiating-user may be required to log into the system before prompting the server to send the initial message.

At a step 306, the requisitioning-user receives the initial message and opens it using an appropriate e-mail application. FIG. 4A illustrates an exemplary embodiment of a server 404 sending an initial e-mail 410 containing a requisition template to a requisitioning-user 402 in accordance with the principles of the present invention. As shown, the e-mail 410 is actually transmitted to the requisitioning-user's e-mail address 412, where it can be viewed by the requisitioning-user 402 accessing his or her e-mail account using an e-mail application on a computer 408.

At a step 308, the requisitioning-user 402 selects a reply option in the e-mail application in order to create a reply message. For example, the requisitioning-user 402 can simply click the reply button in the e-mail program menu bar, select reply from the drop-down menu, or click a reply link (such as an image or highlighted text) in the body of the initial message 410. The initial message 410 is configured such that the selection of this reply option creates a reply message that contains the requisition template, preferably in the body of the reply message. The reply message is automatically addressed to a specific e-mail address that is accessible to the server.

FIG. 5A illustrates an exemplary embodiment of the requisition template 500A included in the initial e-mail to the user in accordance with the principles of the present invention. Template 500A comprises an item image field 502, an item description field 504, an item price field 506, and an item quantity field 508. The image field 502 displays an image of the appropriate item. The different patterns 502-1, 502-2, 502-3, and 502-4 are used to represent the different images for the different items (Mouse Pad, Ink Cartridge, USB Device Cable, and Self-Stick Notes). The description field 504 displays the item name, and can include additional details about the item such as size, quantity and color. The price field 506 displays the corresponding price for each item. Finally, the quantity field 508 displays how many units of each item are being requisitioned. In a preferred embodiment, the quantity field 508 for each item is initially set at zero. In this situation, if the requisitioning-user wants to requisition an item, he or she enters the desired quantity. However, it is contemplated that the template can be configured to have the quantity of certain items initially set at a number greater than zero in order to reflect the requisitioning-user's past requisitions and/or anticipate the requisitioning-user's future needs.

At step a 310, the requisitioning-user can set the quantity of items to the desired amount for each item in the requisition template in the reply message. In this respect, the requisition template is adjustable. If the template initially reflects the requisitioning-user's needs as mentioned above, then this step is not required, since the quantity field is already set at the correct amount. FIG. 5B illustrates an exemplary embodiment of the requisition template 500B included in the reply e-mail to the server in accordance with the principles of the present invention. Whereas the initial template 500A had the quantity fields all set to zero, the template 500B reflects the adjustments made by the requisitioning-user to set the item quantities at different amounts. The initial template 500A had the quantities for the Mouse Pad, the Ink Cartridge, the USB Device Cable, and the Self-Stick Notes all set to zero. The adjusted template 500B shows the quantities having been set by the requisitioning-user to one for the Mouse Pad, four for the Ink Cartridge, zero for the USB Device Cable, and two for the Self-Stick Notes.

It is contemplated that the form and function of the requisition template within the initial e-mail and the reply e-mail can be configured in a variety of different embodiments within the scope of the present invention. Ultimately, the present invention preferably allows the template to be both viewable and adjustable in at least one of the initial e-mail or the reply e-mail, and that the requisitioning-user can include this template in a reply e-mail simply by selecting a reply option. The exact period in which the template can be viewed or adjusted can vary from embodiment to embodiment. For example, in one embodiment, the requisition template can be included in the initial e-mail as an attachment, yet not be viewable in the e-mail body. In this embodiment, the template becomes viewable and adjustable in the reply e-mail. In another embodiment, the template is not be viewable and/or adjustable in the reply e-mail. Instead, the requisitioning-user views the template upon receipt of the initial e-mail, sets the item quantities as desired in the template of the initial e-mail, then selects the reply option, which takes the set template and includes it in the reply e-mail. In addition to these examples, several other embodiments are within the scope of the present invention as well.

Furthermore, upon receipt of the initial e-mail, the requisitioning-user can share the accompanying template with other users by forwarding them the initial e-mail. If these other users decide to create a reply e-mail with the template from this initial e-mail, the server will be able to distinguish these additional reply e-mails from the original requisitioning-user's reply e-mail by recognizing the e-mail address of the user sending the reply e-mail. Since clicking the reply button on the e-mail application by the other users would undesirably result in a reply e-mail message being addressed to the requisitioning-user that forwarded the template (instead of correctly addressing the reply e-mail message to the system server e-mail address), these other users preferably click on a link in the received template that is configured to result in the creation of a reply e-mail message that is addressed to the system server e-mail address.

At a step 312, the requisitioning-user sends the reply message containing the template to the server. FIG. 4B illustrates an exemplary embodiment of the requisitioning-user 402 sending a reply e-mail 414 containing the requisition template to the server 404 in accordance with the principles of the present invention. The requisitioning-user 402 preferably sends the reply e-mail 414 from his or her e-mail account 412 using an e-mail program on computer 408.

At a step 314, the server receives and reads the reply e-mail. As mentioned above, the reply e-mail is preferably addressed to a specific e-mail address accessible by the server so that the server can automatically parse the reply e-mail once it is delivered. The server is configured to determine the identity, and therefore the associated user information, of the requisitioning-user based on the e-mail address from which the reply e-mail was transmitted.

At a step 316, in processing the reply e-mail, the system can apply a set of intelligent defaults based on its identification of the requisitioning-user and the requested items in the template. Such defaults can include, but are not limited to, commodity information of the items, suppliers of the items, shipping address of the user, and the billing account information of the user. The server stores the requisition information from the reply message, such as the quantity of each item requested and the identity of the associated requisitioning-user (and possibly default information), preferably associating each requisition with the requisitioning-user based on the e-mail address from which the reply message was sent. The server can then use this information, along with user information stored on the server (such as the requisitioning-user's authority level) in order to determine whether or not it is necessary to obtain approval from another member of the organization (such as another user with a higher authority level) before completing the requisition.

At a step 318, the server 404 can send the user 402 a confirmation e-mail to inform the requisitioning-user that his or her reply e-mail 414 was received by the server 404 and is being processed. The confirmation message can include a copy of the reply template, showing the requested items and the corresponding quantities. The confirmation message may alternatively provides an error notification indicating that the server could not process the requisitioning-user's request for some reason. This confirmation e-mail is useful in providing the requisitioning-user with information about the status of his or her requisition. It can also serve as a security procedure. For example, if a first employee uses a second employee's e-mail account to inappropriately requisition items, the confirmation e-mail will be sent to the second employee's e-mail address, thereby notifying the second employee of this inappropriate requisition.

Figure 6:
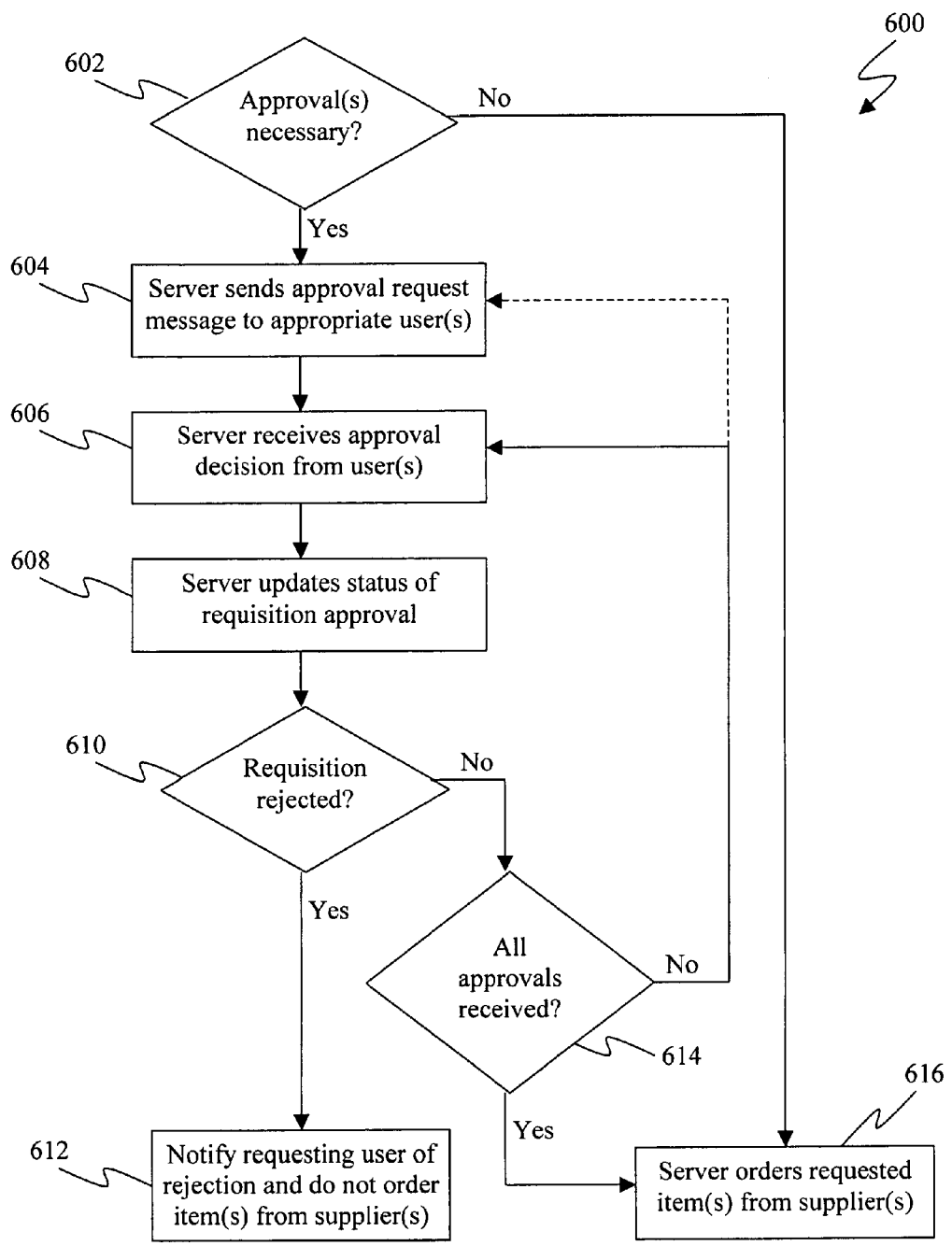
FIG. 6 is a flowchart illustrating an exemplary embodiment of incorporating an approval process into the e-mail requisitioning system of the present invention.

At a step 320, the server can perform a requisition approval process if necessary. FIG. 6 is a flowchart illustrating an exemplary embodiment of incorporating an approval process 600 into the e-mail requisitioning system of the present invention. At a step 602, the server determines whether or not any approvals are necessary in order to proceed with ordering the requested item(s). If no approvals are necessary, then the server simply orders the requested item(s) from the supplier(s) at a step 616. Ordering the item(s) can involve automatically generating a purchase order including the item(s) and sending the purchase order electronically to the supplier(s).

If approvals are necessary, then the server proceeds to a step 604 where it sends a message requesting approval of the requisition to the appropriate users (approving-users). This approval request message preferably includes information regarding the requisition, such as the identity of the user making the request, the items, and the associated price. The approval request message can also include an indication of whether or not a certain requisition exceeds a particular budget, whether that budget pertains to a specific user or to a specific department in which the user works.

Upon receiving the approval request message, the approving-user can make a decision about whether to approve the requisition. The approving-user can then provide this decision to the server. It is contemplated that this decision can be provided to the server in a variety of ways. In one embodiment, the approving-user can send a reply e-mail to the server indicating approval or disapproval of the requisition. For example, this decision can be indicated by marking certain predetermined fields in the reply e-mail (such as checking a box that is labeled "Approve") or by entering certain terms in the reply e-mail that the server is configured to parse out and associate with either approval or rejection. Additionally or alternatively, the approving-user can provide his or her decision by using a web browser to log into the server, view the requisition, and select either an approval or rejection option online. At a step 606, the server receives some form of approval decision from an approving-user.

At a step 608, the server updates the status of the requisition approval based on any decisions it has received. In other words, the server keeps track of any decisions that it is waiting for and any decisions that it has received. This approval status information can be made available to appropriate users, such as the requisitioning-user.

At a step 610, the server determines whether or not the requisition has been rejected. If the requisition has been rejected, then the server proceeds to a step 612, where it notifies the requisitioning-user of the rejection, such as by e-mail, and abstains from ordering the requested item(s) from the supplier(s). If the requisition has not been rejected, the server then proceeds to a step 614 where it determines whether or not all of the necessary approvals have been received. If all of the necessary approvals have been received, then the server orders the requested item(s) from the supplier(s) at a step 616 as previously discussed. If all of the necessary approvals have not yet been received, then the server awaits receipt of the approval decision from the approving-user(s) back at the step 606. As indicated by the dotted line, the server may additionally send an another approval request message at the step 604 in order to remind the approving-user(s) that his or her decision is still required.

In the situation where approvals are required from multiple users, it is contemplated that in addition, or as an alternative, to sending approval request messages to all of these users in parallel fashion, the server can build an approval path where approval decisions for multiple users are requested and obtained in serial fashion. For example, if approval is necessary from a supervisor, a manager, and a vice-president, it is possible to leave the manager and vice-president out of the process until their involvement is absolutely necessary. Accordingly, the server would initially send an approval request message only to the supervisor. Once the server receives approval from the supervisor, it would then send an approval request message to the manager. Upon receipt of approval from the manager, the server would finally send an approval request message to the vice-president. In this fashion, the higher level employees are not burdened with the approval process until the appropriate lower level employees have already approved the requisition. However, in certain circumstances where an expedited approval process is desired, a parallel approval process can be employed, whereby the approval requests are sent to all of the necessary personnel at once.

Referring back to FIG. 3, once the server receives the final necessary approval, it generate the appropriate purchase order(s), and send the purchase order(s) to the appropriate supplier(s). A purchase order preferably identifies the requested items along with the desired quantity. Certain default information can be included as well. A record of the purchase order can be stored on the server for subsequent access and review by an appropriate user.

In a preferred embodiment, the requisitioning-user can access the server and view the status of his or her requisition to see how far along it is in the approval process. For example, the requisitioning-user can find out whose approval is still required (i.e., who is holding up the process). The requisitioning-user can obtain this access in a variety of ways. The user can view the requisition status by opening his or her browser to a predetermined web site and entering the appropriate login information. Additionally or alternatively, the confirmation e-mail discussed above can include a link that, when clicked, opens the browser and brings the requisitioning-user directly to the status information on the server.

The term "user" is applied in a variety of situations discussed above and can be interpreted to apply to several different types of people that use the program of the present invention and have different and sometimes overlapping roles, responsibilities and capabilities. The server is configured to recognize and apply these different and overlapping roles, responsibilities and capabilities in enabling the users to perform certain operations, such as the operations discussed above. Different operations can have different informational requirements by the server. For example, the server must obtain the e-mail address of a requisitioning-user so that it knows where to send the initial e-mail and so that it can identify from whom it is receiving the reply e-mail. For an administrative user (i.e., a user that will be enabled to perform certain administrative operations discussed above), the server only requires information that is sufficient to verify the identity of the administrative user, such as a login ID and a password. It is contemplated that the server may also require an authority level for both a requisitioning-user and an administrative user in order to determine the necessary approvals and what administrative operations may be performed. It is also contemplated that these roles can overlap as mentioned above. An administrative user, such as a supervisor, may also be registered with the server to act as a requisitioning-user.

Such a user would be able requisition items using his or her e-mail address, as well as perform certain administrative functions. Other users may have more limited and restricted roles.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of enabling the requisitioning of items over a network, the network connected to a server, thereby allowing communication between the server and a generating-user, a requisitioning-user, and an initiating-user, the method comprising the steps of:

the server generating a requisition template in response to input received from the generating-user; and the server sending an initial e-mail message to the requisitioning-user's e-mail address in response to direction received from the initiating-user, the initial e-mail message including the requisition template, wherein the initial e-mail message is configured to result in the creation of a reply e-mail message in response to the requisitioning-user selecting to reply to the initial e-mail message from the e-mail application that is accessing the initial e-mail message, the reply e-mail message including the requisition template;

wherein the requisition template comprises one or more indicium, each indicium being configured to represent an item that can be requisitioned by the requisitioning-user and each indicium having an associated quantity field, the quantity field representing a quantity of the associated item that is desired by the requisitioning-user;

the server receiving the reply e-mail message from the requisitioning-user's e-mail address;

the server processing the reply e-mail message, wherein the server determines the identity and the quantity of any items desired by the requisitioning-user based on a reading of the associated quantity fields in the requisition template of the reply e-mail message, wherein the server determines the requisitioning-user's e-mail address from which the reply-e-mail message was sent, and wherein the server determines default information based on at least one of the group consisting of the identity of any of the desired items, the quantity of any of the desired items, and the requisitioning-user's e-mail address; and the server associating the requisitioning-user's e-mail address with the identity and the quantity of any items desired by the requisitioning-user.

2. The method of claim 1, wherein the input received from the generating-user is a selection of the one or more indicium to be included in the requisition template.

3. The method of claim 1, wherein the quantity field is configured to be set to a desired value by the requisitioning-user, the desired value being different from the original value of the quantity field at the time the initial e-mail message was received by the requesting-user, and the requisition template in the reply e-mail message is configured to include the desired value in the quantity field.

4. The method of claim 3, wherein the quantity field is configured to be set to a desired value by the requisitioning-user while the requisition template is in the body of the reply e-mail message.

5. The method of claim 1, further comprising the server sending a confirmation e-mail message to the requisitioning-user's e-mail address in response to receiving the reply e-mail message from the requisitioning-user, the confirmation e-mail message containing information indicating the identity and the quantity of any items desired by the requisitioning-user based on the reading of the associated quantity fields in the requisition template of the reply e-mail message.

6. The method of claim 1, further comprising:

the server determining whether it is necessary to perform an approval process based on at least one of the group consisting of the requisitioning-user's e-mail address, the identity of any items desired by the requisitioning-user, and the quantity of any items desired by the requisitioning-user; and the server performing the approval process if the server determines that it is necessary.

7. The method of claim 6, wherein the approval process comprises:

the server sending an approval-request e-mail message to an approving-user's e-mail address, wherein the approving-user is connected to the server through the network, and the approval-request e-mail message provides notification of the identity and the quantity of an item desired by the requisitioning-user and requests approval for the ordering of the quantity of the item; and the server receiving an approval-decision from the approving-user.

8. The method of claim 7, wherein the approval process further comprises the server sending a rejection notification message to the requisitioning-user's e-mail address if the approval-decision received from the approving-user is a rejection.

9. A method of enabling the requisitioning of items over a network, the network connected to a server, thereby allowing communication between the server and a generating-user, a requisitioning-user, and an initiating-user, the method comprising the steps of:

the server generating a requisition template in response to input received from the generating-user;

the server sending an initial e-mail message to the requisitioning-user's e-mail address in response to direction received from the initiating-user, the initial e-mail message including the requisition template;

the requisitioning-user receiving the initial e-mail message at the requisitioning-user's e-mail address;

the requisitioning-user accessing the initial e-mail message using an e-mail application;

the requisitioning-user selecting to reply to the initial e-mail message from the e-mail application; and the e-mail application creating a reply e-mail message in response to the requisitioning-users selection to reply, wherein the reply e-mail message includes the requisition template;

wherein the requisition template comprises one or more indicium, each indicium being configured to represent an item that can be requisitioned by the requisitioning-user and each indicium having an associated quantity field, the quantity field representing the quantity of the associated item that is desired by the requisitioning-user;

the requisitioning-user sending the reply e-mail message to the server from the requisitioning-user's e-mail address;

the server receiving the reply e-mail message from the requisitioning-user;

the server processing the reply e-mail message, wherein the server determines the identity and the quantity of any items desired by the requisitioning-user based on a reading of the associated quantity fields in the requisition template of the reply e-mail message, wherein the server determines the requisitioning-user's e-mail address from which the reply e-mail message was sent, and wherein the server determines default information based on at: least one of the group consisting of the identity of any of the desired items, the quantity of any of the desired items, and the requisitioning-user's e-mail address; and the server associating the requisitioning-user's e-mail address with the identity and the quantity of any items desired by the requisitioning-user.

10. The method of claim 9, wherein the input received from the generating-user is a selection of the one or more indicium to be included in the requisition template.

11. The method of claim 9, further comprising the requisitioning-user setting the quantity field to a desired value, the desired value being different from the original value of the quantity field at the time the initial e-mail message was received by the requesting-user, wherein the requisition template in the reply e-mail message is configured to include the desired value in the quantity field.

12. The method of claim 11, wherein the requisitioning-user sets the quantity field to a desired value while the requisition template is in the body of the reply e-mail message.

13. The method of claim 9, further comprising the server sending a confirmation e-mail message to the requisitioning-user's e-mail address in response to receiving the reply e-mail message from the requisitioning-user, the confirmation e-mail message containing information indicating the identity and the quantity of any items desired by the requisitioning-user based on the reading of the associated quantity fields in the requisition template of the reply e-mail message.

14. The method of claim 9, further comprising:
the server determining whether it is necessary to perform an approval process based on at least one of the group consisting of the requisitioning-user's e-mail address, the identity of any items desired by the requisitioning-user, and the quantity of any items desired by the requisitioning-user; and
the server performing the approval process if the server determines that it is necessary.

15. The method of claim 14, wherein the approval process comprises:
the server sending an approval-request e-mail message to an approving-user via the approving-user's e-mail address, wherein the approving-user is connected to the server through the network, and the approval-request e-mail message provides notification of the identity and the quantity of an item desired by the requisitioning-user and requests approval for the ordering of the quantity of the item;
the approving-user receiving the approval-request e-mail message at the approving-user's e-mail address;
the approving-user providing the server with an approval-decision over the network; and
the server receiving the approval-decision.

16. The method of claim 15, wherein the approval process further comprises the server sending a rejection notification message to the requisitioning-user's e-mail address if the approval-decision received from the approving-user is a rejection.

17. A program storage device readable by a machine, tangibly embodying a program of instructions executable by the machine to perform a method for enabling the requisitioning of items over a network, the network connected to the machine, thereby allowing communication between the machine and a generating-user, a requisitioning-user and an initiating-user, the method comprising:
the machine generating a requisition template in response to input received from the generating-user; and
the machine sending an initial e-mail message to the requisitioning-user's e-mail address in response to direction received from the initiating-user, the initial e-mail message including the requisition template,
wherein the initial e-mail message is configured to result in the creation of a reply e-mail message in response to the requisitioning-user selecting to reply to the initial e-mail message from the e-mail application that is accessing the initial e-mail message, the reply e-mail message including the requisition template
wherein the requisition template comprises one or more indicium, each indicium being configured to represent an item that can be requisitioned by the requisitioning-user and each indicium having an associated quantity field, the quantity field representing the quantity of the associated item that is desired by the requisitioning-user;
the machine receiving the reply e-mail message from the requisitioning-user's e-mail address;
the machine processing the reply e-mail message, wherein the machine determines the identity and the quantity of any items desired by the requisitioning-user based on a reading of the associated quantity fields in the requisition template of the reply e-mail message, where in the machine determines the requisitioning user's e-mail address from which the reply e-mail message was sent, and wherein the machine determines default information based on at least one of the group consisting of the identity of any of the desired items, the quantity of any of the desired items, and the requisitioning-user's e-mail address; and
the machine associating the requisitioning-user's e-mail address with the identity and the quantity of any items desired by the requisitioning-user.

18. The device of claim 17, wherein the input received from the generating-user is a selection of the one or more indicium to be included in the requisition template.

19. The device of claim 17, wherein the quantity field is configured to be set to a desired value by the requisitioning-user, the desired value being different from the original value of the quantity field at the time the initial e-mail message was received by the requesting-user, and the requisition template in the reply e-mail message is configured to include the desired value in the quantity field.

20. The device of claim 19, wherein the quantity field is configured to be set to a desired value by the requisitioning-user while the requisition template is in the body of the reply e-mail message.

21. The device of claim 17, wherein the method further comprises the machine sending a confirmation e-mail message to the requisitioning-user's e-mail address in response to receiving the reply e-mail message from the requisitioning-user, the confirmation e-mail message containing information indicating the identity and the quantity of any items desired by the requisitioning-user based on the reading of the associated quantity fields in the requisition template of the reply e-mail message.

22. The device of claim 17, wherein the method further comprises:
- the machine determining whether it is necessary to perform an approval process based on at least one of the group consisting of the requisitioning-user's e-mail address, the identity of any items desired by the requisitioning-user, and the quantity of any items desired by the requisitioning-user; and
- the machine performing the approval process if the machine determines that it is necessary.

23. The device of claim 22, wherein the approval process comprises:
- the machine sending an approval-request e-mail message to an approving-user's e-mail address, wherein the approving-user is connected to the machine through the network, and the approval-request e-mail message provides notification of the identity and the quantity of an item desired by the requisitioning-user and requests approval for the ordering of the quantity of the item; and
- the machine receiving an approval-decision from the approving-user.

24. The device of claim 23, wherein the approval process further comprises the machine sending a rejection notification message to the requisitioning-user's e-mail address if the approval-decision received from the approving-user is a rejection.

* * * * *